(12) United States Patent
Kiecksee

(10) Patent No.: US 9,347,564 B2
(45) Date of Patent: May 24, 2016

(54) PROTECTIVE DEVICE FOR PISTON ROD-CYLINDER APPARATUS

(71) Applicant: Jörg Kiecksee, Weinstadt (DE)

(72) Inventor: Jörg Kiecksee, Weinstadt (DE)

(73) Assignee: AKTIEBOLAGET SKF, Gohtenburg (SE)

( * ) Notice: Subject to any disclaimer, the term of this patent is extended or adjusted under 35 U.S.C. 154(b) by 0 days.

(21) Appl. No.: 14/229,125

(22) Filed: Mar. 28, 2014

(65) Prior Publication Data

US 2014/0333033 A1  Nov. 13, 2014

(30) Foreign Application Priority Data

Mar. 28, 2013  (DE) .................... 20 2013 101 384 U

(51) Int. Cl.
| | | |
|---|---|---|
| *F16F 9/38* | (2006.01) | |
| *F16J 15/32* | (2016.01) | |
| *F16F 9/36* | (2006.01) | |
| *F16J 15/56* | (2006.01) | |
| *F15B 15/14* | (2006.01) | |

(52) U.S. Cl.
CPC ......... *F16J 15/3268* (2013.01); *F15B 15/1461* (2013.01); *F16F 9/362* (2013.01); *F16F 9/38* (2013.01); *F16J 15/56* (2013.01); *F16F 2230/0023* (2013.01); *F16J 15/3252* (2013.01)

(58) Field of Classification Search
CPC ........... F16F 9/3242; F16F 9/362; F16F 9/36; F16F 9/38; F16F 2230/0023; F16J 15/3248; F16J 15/3252; F16J 15/3268; F16J 15/56; F16B 15/1461
See application file for complete search history.

(56) References Cited

U.S. PATENT DOCUMENTS

| | | | | |
|---|---|---|---|---|
| 3,104,916 | A * | 9/1963 | Dowling et al. | ................. 384/16 |
| 3,227,497 | A * | 1/1966 | Heckethorn | ..................... 384/16 |
| 6,357,757 | B1 * | 3/2002 | Hibbler et al. | ................ 277/551 |
| 7,665,740 | B2 * | 2/2010 | Munekata et al. | ............ 277/436 |
| 2006/0219506 | A1* | 10/2006 | Zdeb | ........................ 188/322.16 |
| 2013/0146408 | A1* | 6/2013 | Lee et al. | ................. 188/322.17 |

* cited by examiner

*Primary Examiner* — Anna Momper
(74) *Attorney, Agent, or Firm* — Bryan Peckjian; SKF USA Inc. Patent Dept.

(57) ABSTRACT

A debris wiping device (15) for a piston rod-cylinder assembly (10) includes a wiper ring (16), which surrounds a central opening (19). The wiper ring (16) includes a flexible element (17) that surrounds the central opening (19). A retaining cap (21) includes a tubular segment (22, 23) that transitions at one end into an end wall (24), which has a through opening (25).

16 Claims, 1 Drawing Sheet

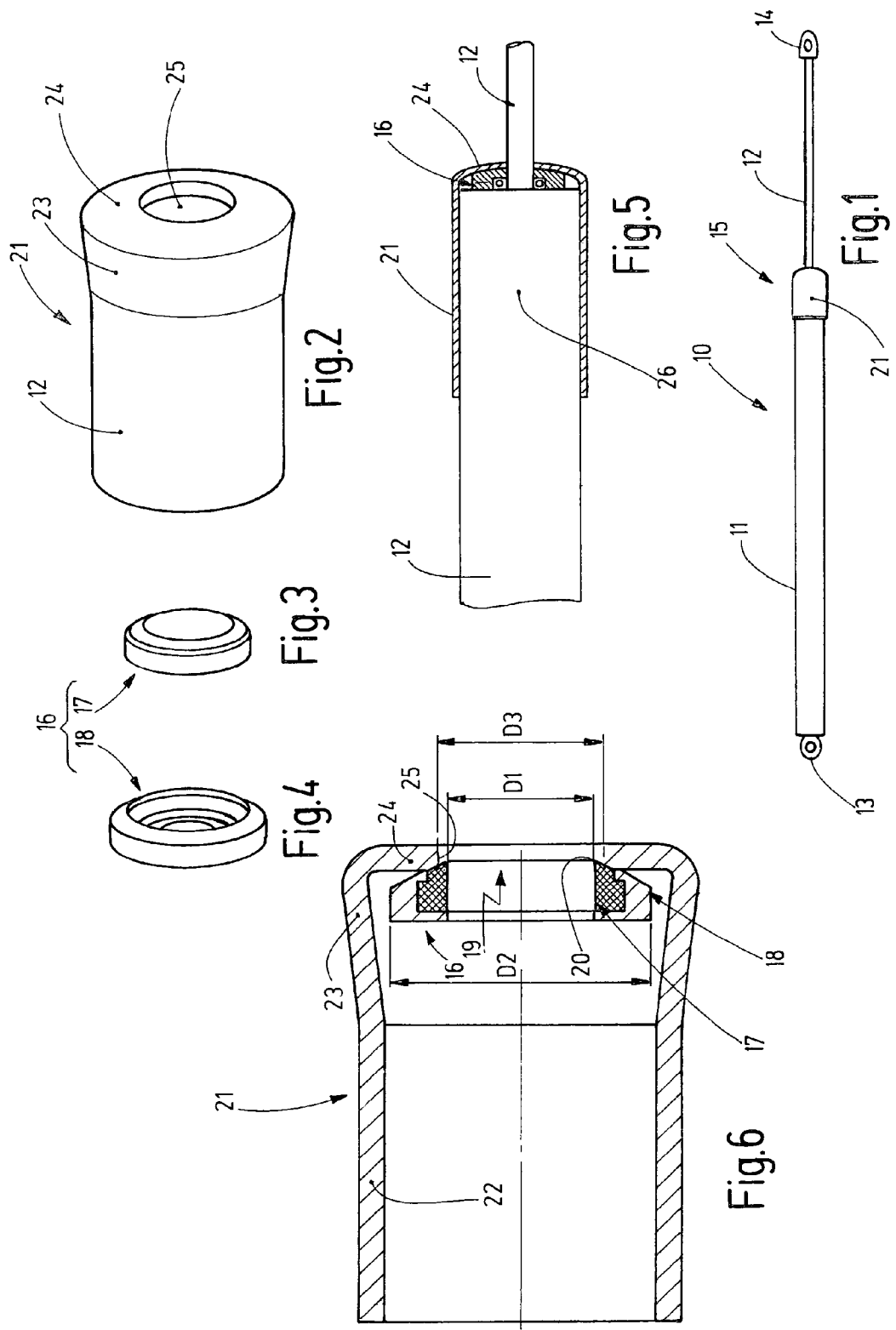

PROTECTIVE DEVICE FOR PISTON ROD-CYLINDER APPARATUS

CROSS-REFERENCE

This application claims priority to German utility model application no. 20 2013 101 384.6 filed Mar. 28, 2013, the contents of which are incorporated herein by reference.

TECHNICAL FIELD

The invention relates to a debris wiping device for gas springs, hydraulic dampers or engines, pneumatic piston rod-cylinder apparatuses or the like.

RELATED ART

Gas springs are known. They normally comprise a cylindrical pipe, which is closed at one end and is provided with a headpiece at its other end, through which the longitudinally-movable piston rod extends in a sealed manner. The interior space of the gas spring contains a high-pressure gas, usually nitrogen. The piston rod is subjected to a force acting in the longitudinal direction by the gas pressure.

Other piston rod-cylinder apparatuses are also known that each have a piston rod, which is guided in a sealed manner through a cylinder opening or a headpiece opening.

When using gas springs or other piston rod-cylinder apparatuses, debris particles can reach the piston rod. If these cause damage to the seal provided in the headpiece, leakages could occur and oil could escape. In the case of a gas spring, it would loss force due to the loss of gas.

SUMMARY

It is an object of the invention to provide a possibility to avoid the slow degradation of piston rod-cylinder apparatuses.

A wiping ring having a central opening is a part of a debris wiping device of the present application, which central opening is surrounded by a flexible element. The central opening has an inner diameter that is somewhat smaller than the diameter of the piston rod. Moreover, the opening is preferably formed slightly conically so that the wiping ring forms a wiping lip or wiping rib that points away from the headpiece of the piston rod-cylinder apparatus. The wiping ring is retained by a retaining cap, whose tube-like or sleeve-like base segment can be pushed onto the end of the gas spring. The cap can be retained on the cylindrical pipe in a friction-fit manner. It can also be secured in a materially-bonded manner, e.g. by adhesive or glue. Moreover, it can be secured in a stationary manner by tape or a fixing clamp.

Preferably, the cap and the wiper ring are provided as separate parts. But, it is also possible to combine them into one part.

The retaining cap has an opening, through which the piston rod extends. It retains the wiping ring on the headpiece and makes possible a certain lateral movability for the wiping ring.

The debris wiping device described thus far can be offered as a retrofit set for existing gas springs or other piston rod-cylinder apparatuses. The flexible retaining cap facilitates a secure and simple attachment of the wiping ring to a gas spring or other piston rod-cylinder apparatus. The debris wiping device can be also be utilized on oil-filled damper elements, e.g., in the vehicle field.

The wiping ring preferably contains an annular, closed wiping element comprised of an elastomer or a somewhat elastic plastic. The above-mentioned wiping lip can be provided on this. The elasticity of the wiping element is sufficiently large in the radial direction that the wiping element is elastically expandable to the diameter of the piston rod.

Moreover, the wiping ring can comprise a ring-shaped retaining body that carries the wiping element. The retaining body can be comprised, e.g., of metal and can accommodate the wiping element. However, modified embodiments are also possible. For example, a stiffening ring can be embedded in the wiping element. In addition, the retaining body can be comprised of a less elastic plastic or the like. Further, it is possible to omit the retaining body.

The cap preferably comprises a flexible material, such as e.g., soft-PVC. In particular, it is advantageous if the tubular segment exhibits a radial elasticity. Moreover, it can be advantageous if the cap exhibits shrinkage properties. For example, after widening, it can want gradually return to its narrow, not-widened shape, or it can be formed, for example, to shrink when heat is applied. This facilitates the attachment of the cap to the gas spring or to the other piston rod-cylinder apparatus.

Preferably, the end-side end of the cap forms a chamber, whose inner diameter is larger than the outer diameter of the wiping ring. In this way, the wiping ring has a radial moveability. Its radial position is determined by the piston rod, not by the cap. On the other hand, it is axially captive between the end wall of the cap and the headpiece of the gas spring.

Further details result from the drawings, the description or the claims.

BRIEF DESCRIPTION OF THE DRAWINGS

FIG. 1 shows a gas spring having a debris wiping device according to the invention in a schematic side view.

FIG. 2 shows in a perspective illustration a cap that is a part of the debris wiping device.

FIG. 3 shows in a schematic, perspective illustration an elastomeric element that is a part of a wiping ring.

FIG. 4 shows in a perspective illustration a retaining body that is a part of the wiping ring.

FIG. 5 shows the gas spring having a debris wiping device in a schematic, partially-cutaway, longitudinal illustration.

FIG. 6 shows the debris wiping device in a longitudinal cross-sectional illustration.

DETAILED DESCRIPTION OF THE INVENTION

In FIG. 1, a gas spring 10 for any piston rod-cylinder apparatus is illustrated in an exemplary manner, which gas spring 10 includes a cylindrical pipe 11 and a piston rod 12. Eyelets 13, 14 or other connecting means are disposed on the outward-lying ends of the cylinder rod 11 and the piston rod 12, respectively. The piston rod 12 is axially movable. High pressure gas prevails in the cylindrical pipe 11 so that the piston rod 12 is biased with a defined force in a direction away from the cylindrical pipe 11.

The gas spring 11 includes a debris wiping device 15, which serves to hinder dust or other foreign matter or contamination sitting on the piston rod 12 from damaging the inner seal of the gas spring 10. For this purpose, the debris wiping device 15 includes a wiper ring 16, which will be developed from FIGS. 5 and 6 and to which belongs a wiping element 17 apparent from FIG. 3 and a retaining body 18 developed from FIG. 4. The wiping element 17 is depicted in FIG. 6 in a detailed manner. It has an opening 19 that, example, can be formed tapering in a slightly conical manner away from the cylindrical pipe 11 as depicted. The diameter D1 is preferably somewhat smaller than the outer diameter of the piston rod 12. Preferably, a wiping edge 20 is formed on the outwardly-directed end of the through-opening 19. This is formed by surfaces that are at an acute angle to each other, namely the wall of the through-opening 19 on the one side and the conical end surface of the wiping ring 17 on the other side.

The wiping element 17, which is preferably comprised of an elastomer or another suitable plastic, is held by the retainer body 18. Preferably, the retainer body 18 is formed by a ring, which has a seat for the wiping element 17. The retaining body 18 surrounds the wiping element preferably radially outwardly as well as on the end side facing towards the cylinder 11. The outer diameter D2 of the retaining body 18 is preferably smaller than the inner diameter of a cap 21, which is provided on the gas spring 10 for mounting the debris wiping ring 16.

The cap 21 is preferably made of a pliable plastic material, such as soft-PVC or the like. It has a tube-like base segment 22, which transitions into a conical segment 23. On the end side, the cap 21 is closed by an end wall 24 that connects to the conical segment 23. The end wall 24 has a through-opening 25, the diameter D3 of which is larger than the diameter D1 and larger than the diameter of the piston rod 12.

The expandable cap 21 is attached to the axial end of the cylindrical pipe 11, from which the piston rod 12 projects as is indicated in FIG. 5. The debris wiping ring 16 is thereby disposed between the end wall 24 and the axial end of the cylindrical pipe 11 and is held there by the cap 21. However, the wiping ring 16 is movable in the radial direction so that it is centered by the piston rod 12.

The debris wiping device 15, comprising the cap 21 and the wiping ring 16, can be offered as a retrofit set for gas springs. For example, after removing the eyelet 14, the wiping ring 16 can be pushed onto the piston rod 12 and secured at its desired location by the cap 21, which is also can be pushed on. The gas spring 10 is thereafter substantially protected against contamination. If dust or dirt collects on the piston rod 12 and the piston rod 12 is then pushed into the cylinder 11, the wiping edge 20 wipes the deposits from the piston rod 12.

It is pointed out that the wiping ring 16 can also be configured in another way. For example, it can be formed as one piece out of plastic or also out of metal with a plastic sheath. Further, it is possible to form the wiping edge 20 between surfaces that are right-angled with respect to each other. Moreover, the retaining ring 18 can apply a radially-inward-directed spring force on the wiping ring 17. The wiping ring 16 is held by the cap 21 in a rattle-free manner. The cap 21 is pushed onto the cylindrical pipe 11 so far that the end wall 24 presses the wiper ring 16 against the end of the cylindrical pipe 11. The retaining ring 18 can be provided or coated with noise-dampening material, e.g., plastic or rubber, on its surface facing the cylindrical pipe 11. Further modifications are possible. For example, the cap can have an inward-projecting bead that engages in a notch or groove provided on the circumference of the cylindrical pipe 11.

Further, it is pointed out that the inventive debris wiping device 15 can be utilized on any type of piston rod-cylinder apparatus. In particular, the debris wiping device 15 is suited for protecting piston rods and their seals when the piston rods 12 have a round cross-section (in particular a circular cross-section).

REFERENCE NUMBER LIST

10 Gas spring
11 Cylindrical pipe
12 Piston rod
13, 14 Eyelets
15 Debris wiping device
16 Debris wiping ring
17 Wiping element
18 Retaining body
19 Through-hole
D1 Diameter
20 Wiping edge
D2 Outer diameter
21 Cap
22 Tube-shaped segment of the cap 21
23 Conical segment of the cap 21
24 End wall of the cap 21
25 Through-opening
D3 Diameter
26 End of the cylindrical pipe
D3 Inner diameter of the through-opening 25

The invention claimed is:
1. An apparatus, comprising:
a cylindrical pipe having an outer diameter and first and second axial ends,
a wiping ring having a flexible element that surrounds a central opening, the wiping ring being located on the second axial end of the cylindrical pipe such that that the flexible element is axially spaced from the second axial end, the wiping ring further comprising an annular retaining body attached to the flexible element, wherein a retaining body maximum diameter is greater than a flexible element maximum diameter,
a retaining cap having a tubular segment that transitions at one end into an end wall, wherein the tubular segment of the retaining cap includes:
a first segment that is hollow cylindrical shaped and having a first segment inner diameter, and
a second segment that is conical and is disposed between the first segment and the end wall, the second segment having a portion with a second segment inner diameter that is greater than the first segment inner diameter,
a through-opening being defined in the end wall, the retaining cap is disposed around the second axial end of the cylindrical pipe such that the wiping ring is axially retained and located entirely between the second axial end of the pipe and the end wall such that the end wall is axially spaced from the second axial end of the cylindrical pipe, and
a piston rod slidably disposed through the central opening of the wiping ring, wherein the wiping ring has an outer diameter that is smaller than the outer diameter of the cylindrical pipe.
2. The apparatus according to claim 1, wherein the flexible element is annular and comprises an elastomer.
3. The apparatus according to claim 2, wherein the annular retaining body is comprised of a shape-stable, rigid material.
4. The apparatus according to claim 3, wherein the retaining cap is comprised of a flexible material.
5. The apparatus according to claim 4, wherein the the first segment inner diameter is larger than an outer diameter of the wiping ring.
6. The apparatus according to claim 5, wherein the through-opening of the retaining cap has a diameter that is larger than an inner diameter of the central opening of the wiping ring.
7. The apparatus according to claim 6, wherein the central opening of the wiping ring is conical shaped.

8. The apparatus according to claim 7, wherein the retaining cap is comprised of soft-PVC.

9. The apparatus according to claim 8, wherein the second segment inner diameter is greater than an outer diameter of the wiper ring.

10. The apparatus according to claim 9, wherein the annular retaining body radially surrounds the flexible element.

11. The apparatus according to claim 3, wherein a retaining body inner diameter is equal to a flexible element inner diameter.

12. The apparatus according to claim 11, wherein at least a portion of the annular retaining body is located axially between the flexible element and the cylindrical pipe such that the flexible element is axially spaced from the second axial end of the cylindrical pipe.

13. The apparatus according to claim 1, wherein the retaining cap is comprised of a pliable material.

14. The apparatus according to claim 1, wherein the second segment inner diameter is larger than an outer diameter of the wiping ring.

15. The apparatus according to claim 1, wherein the through-opening of the retaining cap has a diameter that is larger than an inner diameter of the central opening of the wiping ring.

16. The apparatus according to claim 1, wherein the central opening is conical shaped.

\* \* \* \* \*